United States Patent
Chen et al.

(10) Patent No.: US 7,430,668 B1
(45) Date of Patent: Sep. 30, 2008

(54) PROTECTION OF THE CONFIGURATION OF MODULES IN COMPUTING APPARATUS

(75) Inventors: Liqun Chen, Bristol (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/913,454

(22) PCT Filed: Feb. 15, 2000

(86) PCT No.: PCT/GB00/00495

§ 371 (c)(1),
(2), (4) Date: Aug. 14, 2001

(87) PCT Pub. No.: WO00/48061

PCT Pub. Date: Aug. 17, 2000

(30) Foreign Application Priority Data

Feb. 15, 1999 (EP) .................................. 99301100
Sep. 25, 1999 (GB) .................................. 9922663.1

(51) Int. Cl.
*H04L 9/00* (2006.01)
*G06F 15/177* (2006.01)
*G06F 11/30* (2006.01)
*G06F 21/00* (2006.01)

(52) U.S. Cl. .............................. 713/187; 713/1; 713/2; 713/100; 713/155; 726/26

(58) Field of Classification Search ................. 713/1–2, 713/100, 200, 155, 187; 380/155; 726/26
See application file for complete search history.

(56) References Cited

U.S. PATENT DOCUMENTS

| 5,029,159 | A | * | 7/1991 | Dolev ........................ 370/216 |
| 5,361,359 | A | | 11/1994 | Tajalli et al. ............... 395/700 |
| 5,363,447 | A | * | 11/1994 | Rager et al. ................ 380/273 |
| 5,421,006 | A | * | 5/1995 | Jablon et al. ................ 714/36 |
| 5,444,850 | A | | 8/1995 | Chang ..................... 395/200.1 |
| 5,499,296 | A | * | 3/1996 | Micali ....................... 713/180 |
| 5,680,547 | A | | 10/1997 | Chang ..................... 395/200.1 |
| 5,844,986 | A | * | 12/1998 | Davis ........................ 713/187 |
| 5,943,423 | A | * | 8/1999 | Muftic ........................ 705/67 |

(Continued)

FOREIGN PATENT DOCUMENTS

EP 0 421 409 A2 4/1991

(Continued)

OTHER PUBLICATIONS

Yee, B., "Using Secure Coprocessors," Doctoral thesis—Carnegie Mellon University, pp. 1-94 (May 1994).

(Continued)

*Primary Examiner*—Minh Dieu Nguyen

(57) ABSTRACT

A method of protecting from modification computer apparatus comprising a plurality of functional modules by monitoring the configuration of functional modules within the computer apparatus. The method comprises: storing a module configuration of the computer apparatus; and checking the actual module configuration against the stored module configuration, and inhibiting function of the computer apparatus if the actual module configuration does not satisfactorily match the stored module configuration. Advantageously, the module configuration is stored on a security token, such as a smart card.

16 Claims, 9 Drawing Sheets

U.S. PATENT DOCUMENTS

| | | | | |
|---|---|---|---|---|
| 5,948,101 | A | * | 9/1999 | David et al. .................... 713/2 |
| 6,012,100 | A | * | 1/2000 | Frailong et al. ............. 709/250 |
| 6,209,089 | B1 | * | 3/2001 | Selitrennikoff et al. ......... 713/2 |
| 6,233,685 | B1 | * | 5/2001 | Smith et al. ................ 713/194 |
| 6,233,687 | B1 | * | 5/2001 | White ........................... 726/3 |
| 6,240,511 | B1 | * | 5/2001 | Blumenau et al. .............. 713/1 |
| 6,327,652 | B1 | | 12/2001 | England et al. ................ 713/2 |
| 6,330,670 | B1 | | 12/2001 | England et al. ................ 713/2 |
| 6,353,885 | B1 | * | 3/2002 | Herzi et al. .................... 713/1 |
| 6,408,392 | B2 | * | 6/2002 | White ......................... 726/26 |
| 6,434,697 | B1 | * | 8/2002 | Leyda et al. ................... 713/2 |
| 6,453,416 | B1 | * | 9/2002 | Epstein ...................... 713/170 |
| 6,539,480 | B1 | * | 3/2003 | Drews ........................ 713/191 |
| 6,560,706 | B1 | * | 5/2003 | Carbajal et al. ............. 713/155 |
| 6,633,981 | B1 | * | 10/2003 | Davis ........................ 713/189 |

FOREIGN PATENT DOCUMENTS

| | | |
|---|---|---|
| EP | 0 510 244 A1 | 10/1992 |
| EP | 0 848 315 A2 | 6/1998 |
| EP | 0 849 657 A1 | 6/1998 |
| WO | WO 95/24696 | 9/1995 |
| WO | WO 97/07463 | 2/1997 |
| WO | WO 97/37305 | 10/1997 |
| WO | WO 98/15082 | 4/1998 |
| WO | WO 98/25372 | 6/1998 |
| WO | 99/31842 | 6/1999 |
| WO | 00/48063 | 8/2000 |

OTHER PUBLICATIONS

Anderson, R. and Markus Kuhn, "Tamper Resistance—a Cautionary Note," 16 pages, located at Internet address <www.cl.cam.ac.uk/~mgk25/tamper.html> (1996).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-E (1999).

The Trusted Computing Platform Alliance, "Building a Foundation of Trust in the PC,", 9 pages, located at Internet address <www.trustedpc.org/home/home.html> (Jan. 2000).

Trusted Computing Platform Alliance, Main Specification Version 1.0, 284 pages (Jan. 25, 2001).

* cited by examiner

PROTECTION OF THE CONFIGURATION OF MODULES IN COMPUTING APPARATUS

TECHNICAL FIELD

This invention relates to the protection of configuration of modules in a computing apparatus.

BACKGROUND ART

Today, most modules (the word "module" is used here to describe essentially any discrete functional element of a computing platform) used in computing apparatus are standardised and freely interchangeable. This is advantageous, in that it lowers both the assembly cost and repair cost for computer apparatus, but has the disadvantage that it is relatively easy for computer apparatus to be reassembled from stolen modules, or to be counterfeited.

Much consideration has been given to the problem of making theft or counterfeiting of computer apparatus less attractive. Various proposals have been made as to how to render stolen apparatus inoperable. One approach is for computer apparatus to be fitted with a security device (such as a dedicated application specific integrated circuit) which can enable or disable function of the computer apparatus. This security device is adapted to receive signals (by means of a secure communications link) from a remote station, and only enables function of the computer apparatus if a desired signal is detected during an appropriate validation routine. On theft of the apparatus, the owner notifies the remote station, and the signal necessary to allow the security device to enable function of the computer apparatus is no longer broadcast.

This prior art solution is useful to prevent a thief from using stolen apparatus directly, but is of no assistance in preventing assembly of new (possibly counterfeit) apparatus by the thief from stolen modules—this is a significant practical concern. The more general, and probably more important, problem, is protection of the configuration of modules within a computer apparatus, and the prevention of reuse of stolen modules in a new configuration.

SUMMARY OF THE INVENTION

Accordingly, in a first aspect the invention provides a method of protecting from modification computer apparatus comprising a plurality of functional modules by monitoring the configuration of functional modules within the computer apparatus, the method comprising: storing a module configuration of the computer apparatus; and checking the actual module configuration against the stored module configuration, and inhibiting function of the computer apparatus if the actual module configuration does not satisfactorily match the stored module configuration.

Use of stored module configurations in this way allows reuse of modules of computer apparatus to be detected and prevented.

Preferably, the stored module configuration is held separately from the computing apparatus. Whether or not stored separately, it is particularly desirable for the stored module configuration to be stored such that it is accessible only by a cryptographic authentication process.

Of particular interest is the case of a host platform which has, directly or indirectly, the facility to verify the existence and functions of the modules in the platform. The present application is particularly relevant to the case of a computer platform which contains verifiable modules and which is adapted to be "trusted" by a user, in the sense that something can be "trusted" if it always behaves in the expected manner for the intended purpose. It is very desirable to prevent computer platforms of this type from being reassembled by an unauthorised party, particularly from stolen modules.

Should trusted platforms of this type become standard, providing the possibility of checking the module configuration of platforms would make theft of computer apparatus that is a part of such a platform much less attractive.

Advantageously, therefore, the computer apparatus contains or is in communication with a trusted device adapted to respond to a user in a trusted manner, and the trusted device is adapted to perform the step of checking the actual module configuration against the stored module configuration.

Preferably, the trusted device is adapted to communicate securely with the stored module configuration. Advantageously, the stored module configuration is held separately from the computer apparatus in a security token—most advantageously a smart card.

In a second aspect, the invention provides computer apparatus adapted for protection against modification, the computer apparatus comprising a plurality of modules, wherein the computer apparatus is adapted to compare a module configuration of the computer apparatus against a stored module configuration.

In a third aspect, the invention provides a security token adapted to hold a stored module configuration of modules in a computer apparatus, and adapted to provide the stored module configuration to the computer apparatus to allow comparison between an actual module configuration of the computer apparatus and the stored module configuration.

In a fourth aspect, the invention provides a service for storing module configurations of computer apparatus remotely from such computer apparatus, wherein the service provides a stored module configuration to a user authorised to receive it.

In one advantageous approach, the service is invoked by the computer apparatus in a step of checking an actual module configuration against the stored module configuration. The step of checking an actual module configuration against the stored module configuration may involve a security token, and the service is invoked in the event of loss of the security token. The service may also be invoked in order to allow modification to the module configuration of computer apparatus.

In order to protect configuration of modules in a trusted platform, the use in a cooperative arrangement of the trusted device, a portable security token and the group of modules used in the host platform proves to be particularly effective. Typically, the arrangement implements a security control policy to establish a module configuration profile that lists the registered module group, and to authenticate the modules listed with help of the portable security token.

It is particularly desirable to implement mutual/unilateral authentication and privilege restriction. In particular, preferred embodiments utilise a novel method of binding the identity of the portable security token with varieties of the modules.

In one preferred arrangement, such computer apparatus comprises: memory means storing the instructions of a secure process and an authentication process; processing means arranged to control the operation of the computing apparatus including by executing the secure process and the authentication process as required; user interface means arranged to receive user input and return to the user information generated by the processing means in response to the user input; interface between the computing apparatus and a portable security token means for receiving the token and communicating with the token, the token comprising a body supporting: a token interface for communicating with the interface means; a token processor; and token memory storing token data including information for identifying the token; wherein the processing means is arranged to receive the identity information from the portable token, authenticate the token using the authentication process and, if the token is successfully authenticated, permit a user to interact with the secure process via the user interface means for the purpose of establishing and modifying a module configuration profile comprising a list of registered modules; type, model, identity and other related information of each module included in the list; and if it is not possible to authenticate the portable token, suspending the interaction between the computing apparatus and the user.

In another preferred arrangement, there is provided a method of controlling computing apparatus to authenticate a module listed in the module configuration profile via an interface between a trusted component and the module means for the trusted component receiving the module and communicating with the module, the module comprising a body supporting: a module interface for communicating with the interface means; module memory storing memory data including information for identifying the module; and the trusted component comprising a body supporting: a component interface for communicating with the above interface means; a component processor; and component memory storing component data including information for identifying the component, wherein the processing means is arranged to receive the identity information from the modules, authenticate the module using the authentication process and, if the module is successfully authenticated, permit a user to interact with the secure process via the user interface means, and if it is not possible to authenticate the module, suspending the interaction between the computing apparatus and the user.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENT

Figure 1:
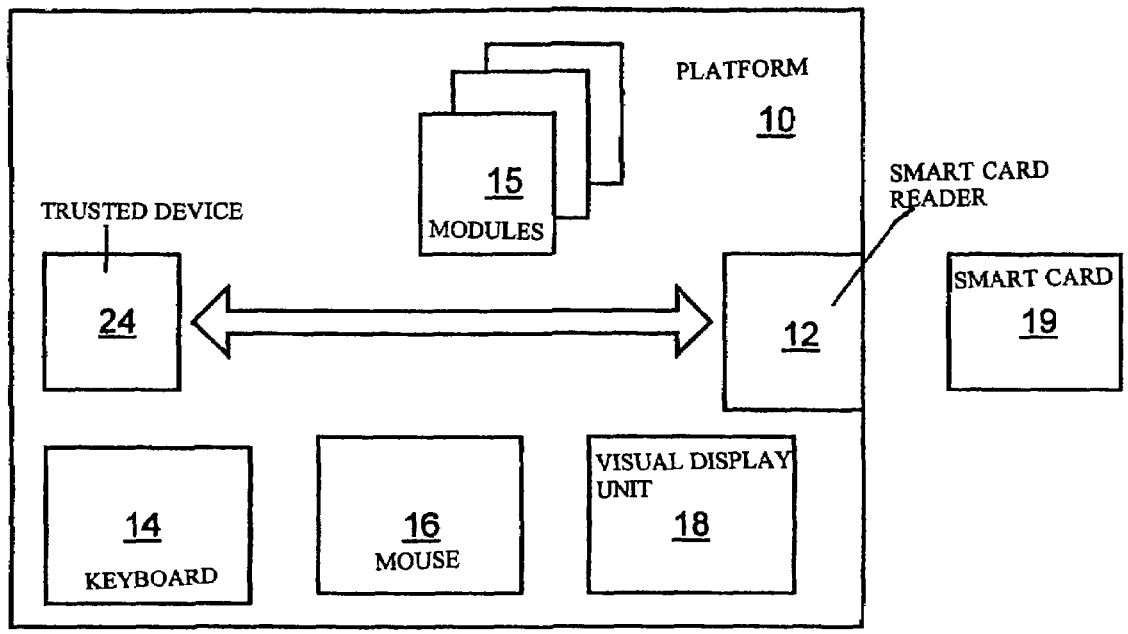
FIG. 1 is a diagram that illustrates a system capable of implementing embodiments of the present invention.

The present invention is generally relevant to the prevention of reconfiguration of computer apparatus by an unauthorised user. The embodiments described relate to a particularly preferred case, in which the computer apparatus is a "trusted" platform (one that is designed always to behave in an expected manner for an intended purpose).

For the purpose of preventing unauthorised reconfiguration, each computer apparatus has a module configuration profile. The profile includes a list of registered modules. The attributes of each module listed in the profile may include type, model, manufacturer, statistically unique identity if there exists one, usage privilege and other related information.

This module configuration profile can be held in a number of different ways, as will be discussed further below. However, in particularly preferred embodiments of the invention the module configuration profile is held on a security token such as smart card. Such a smart card is here termed an MCA (Module Configuration Authority) smart card, or "MCA smart card". The MCA smart card is adapted to communicate in a secure manner with a trusted device within the trusted platform. The trusted device and the MCA smart card (or other security token) could be a secure pair with a trusted relationship based on strong authentication between each other.

By transferring the module configuration profile to the trusted device, the security token introduces each module listed in the profile to the trusted device, which is then able to authenticate those modules. It is strongly desirable that both the security token and the trusted device have the function of tamper-resistant storage to store the module configuration profile.

After a reset of the trusted computing platform, the trusted device checks whether every module present in the platform is listed in the module configuration profile. For the sake of simplicity of description, only three types of modules are considered in any detail herein:

A module which has a cryptographic identity, that is, one for which the process of authentication requires at least one private key for some cryptographic functions, such as signature and/or decryption. This module can be authenticated by the trusted device without further direct interaction with the MCA smart card. Examples of this type of module include a smart card with cryptographic functions, a cryptographic coprocessor, and a hard disk drive with security functions.

A module which has a built-in serial number as an identity, which is at least statistically unique and is stored inside the module in a tamper-resistant fashion. This module may or may not be able to be authenticated by the trusted device without direct interaction with the MCA smart card. Examples of this type of module include a smart card with secure storage function, a network card, and an Intel Pentium III processor.

A module which has no distinguishable identity. Such a module is freely interchangeable and the authorisation of the module can be ensured with direct interaction with the MCA smart card. For example, when the trusted device meets a module without a distinguishable identity, the device will ask for presentation of the MCA smart card to confirm a valid authorisation of the module.

The elements and the operation of a trusted platform (containing a trusted device used in the operations indicated above) will now be described. After that, a smart card appropriate for use as an MCA smart card (in conjunction with a trusted platform as here described) will also be described. The process of authorisation for each of the three types of module described above will then be described also.

The embodiment of a trusted platform here described has as its central feature the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
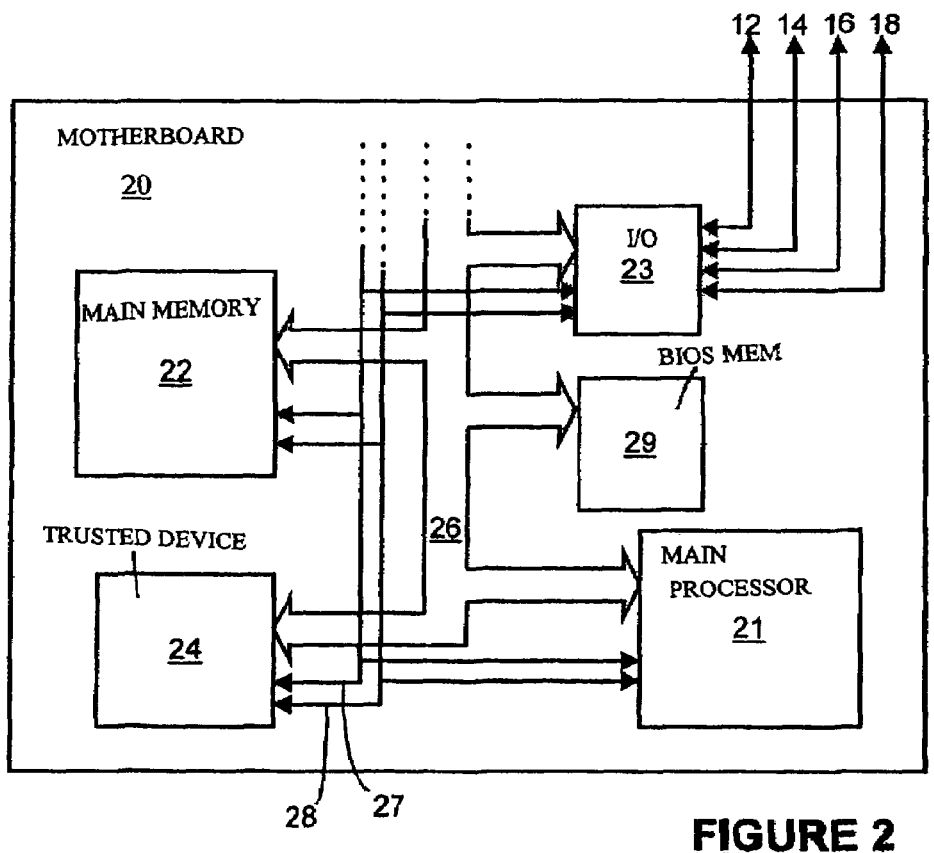
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses F000h to FFFFh), and the main processor is arranged to look at this memory location first, in accordance with an industry wide standard The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
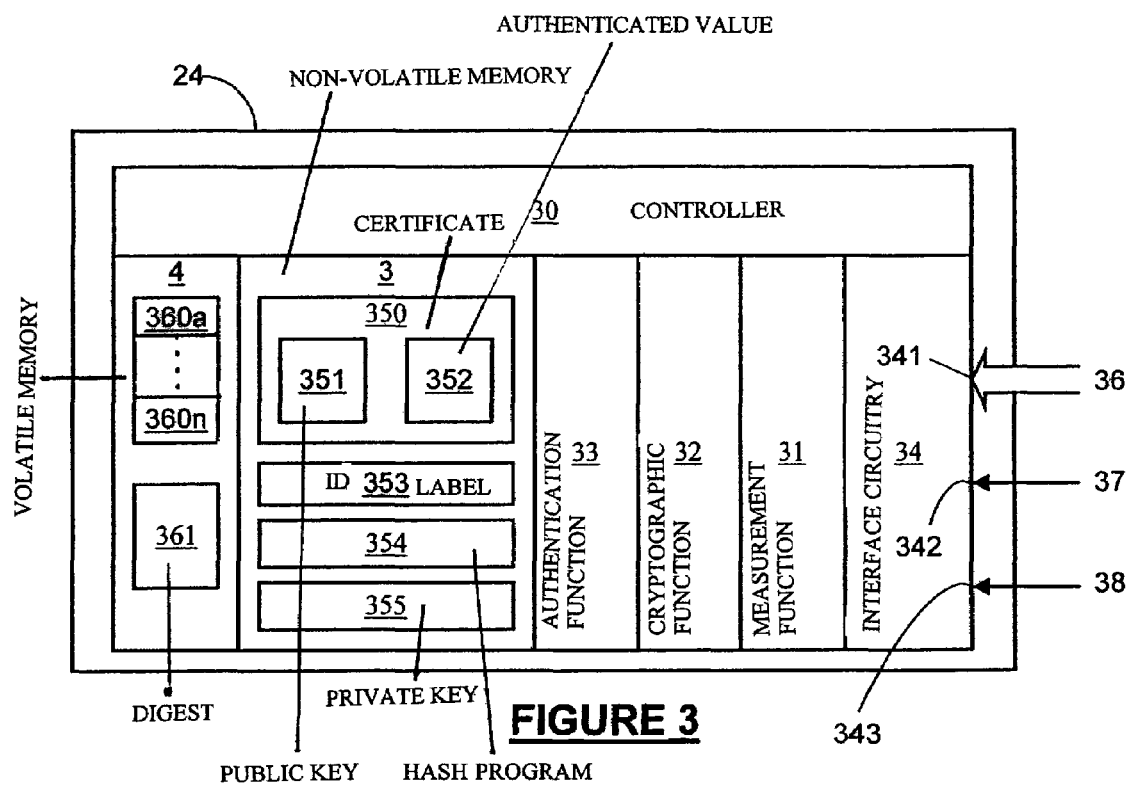
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 3 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
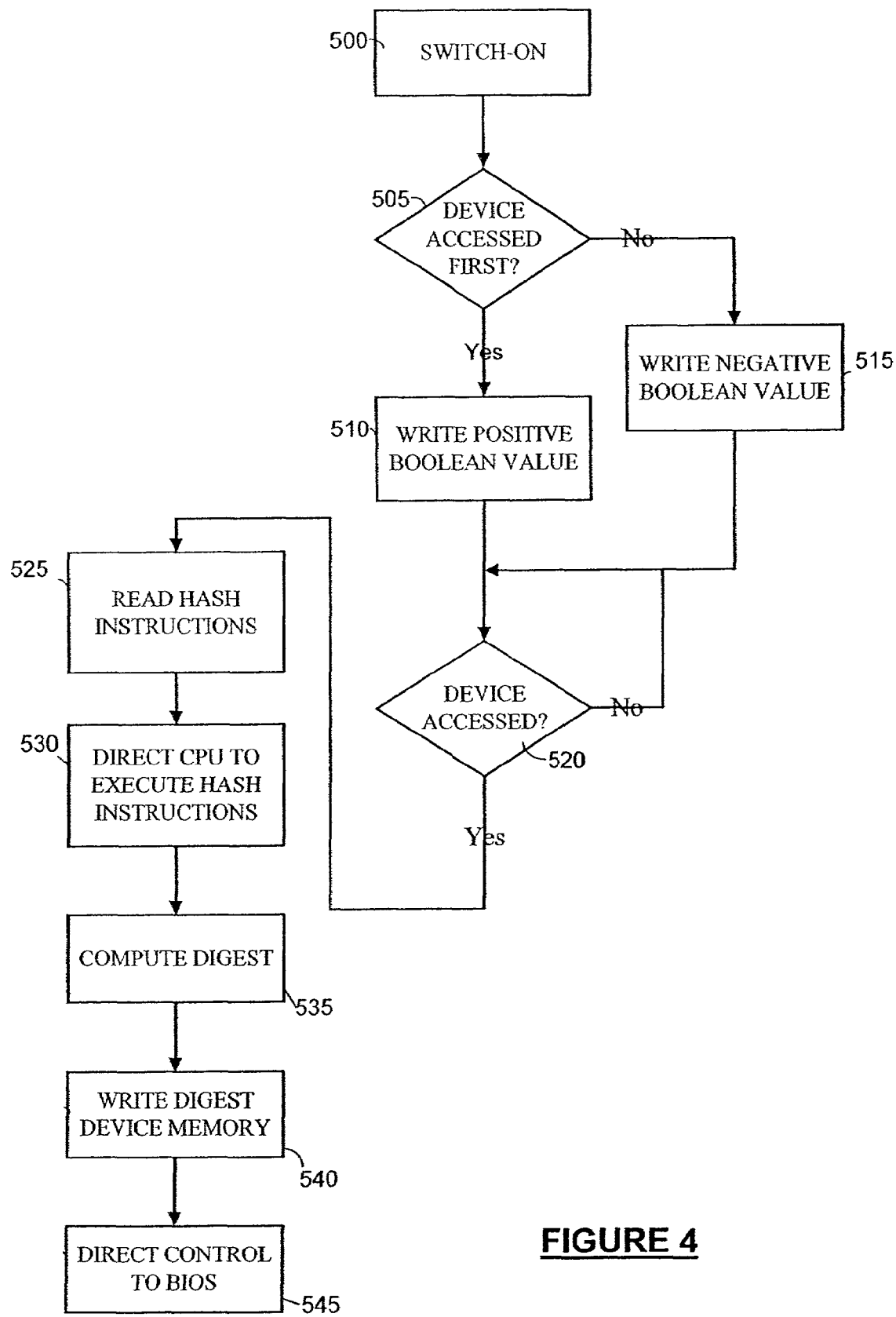
FIG. 4 is a flow diagram which illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory

29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co processors, on the platform could be verified by enacting fixed challenge/response interactions to ensure consistent results—this checking of the configuration of the platform is the domain of the present invention, and is discussed further below with reference to FIGS. 8 to 10. Where the trusted device 24 is a separable component, some such form of interaction is desirable to provide an appropriate logical binding between the trusted device 24 and the platform. Also, although in the present embodiment the trusted device 24 utilizes the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
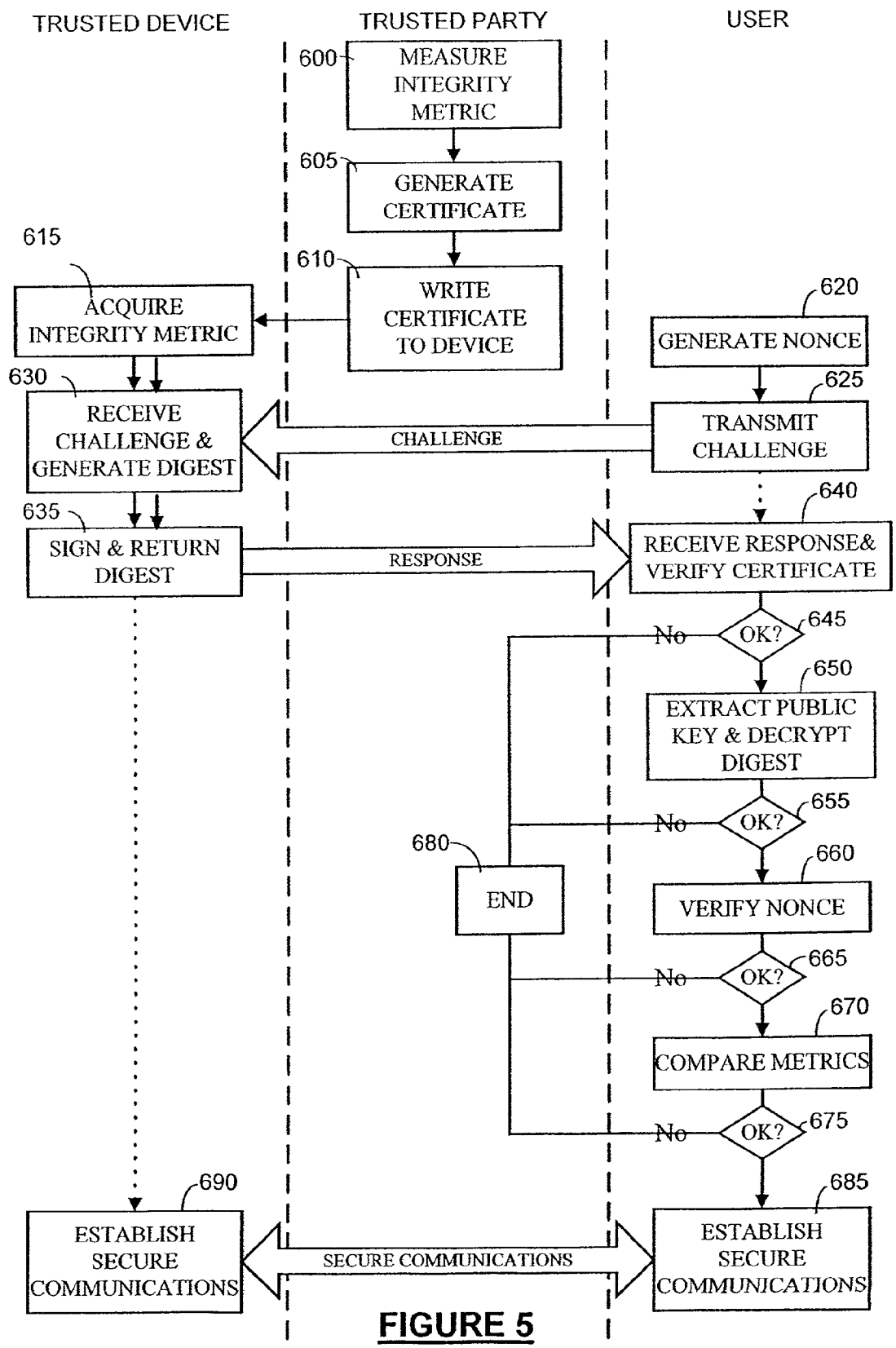
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
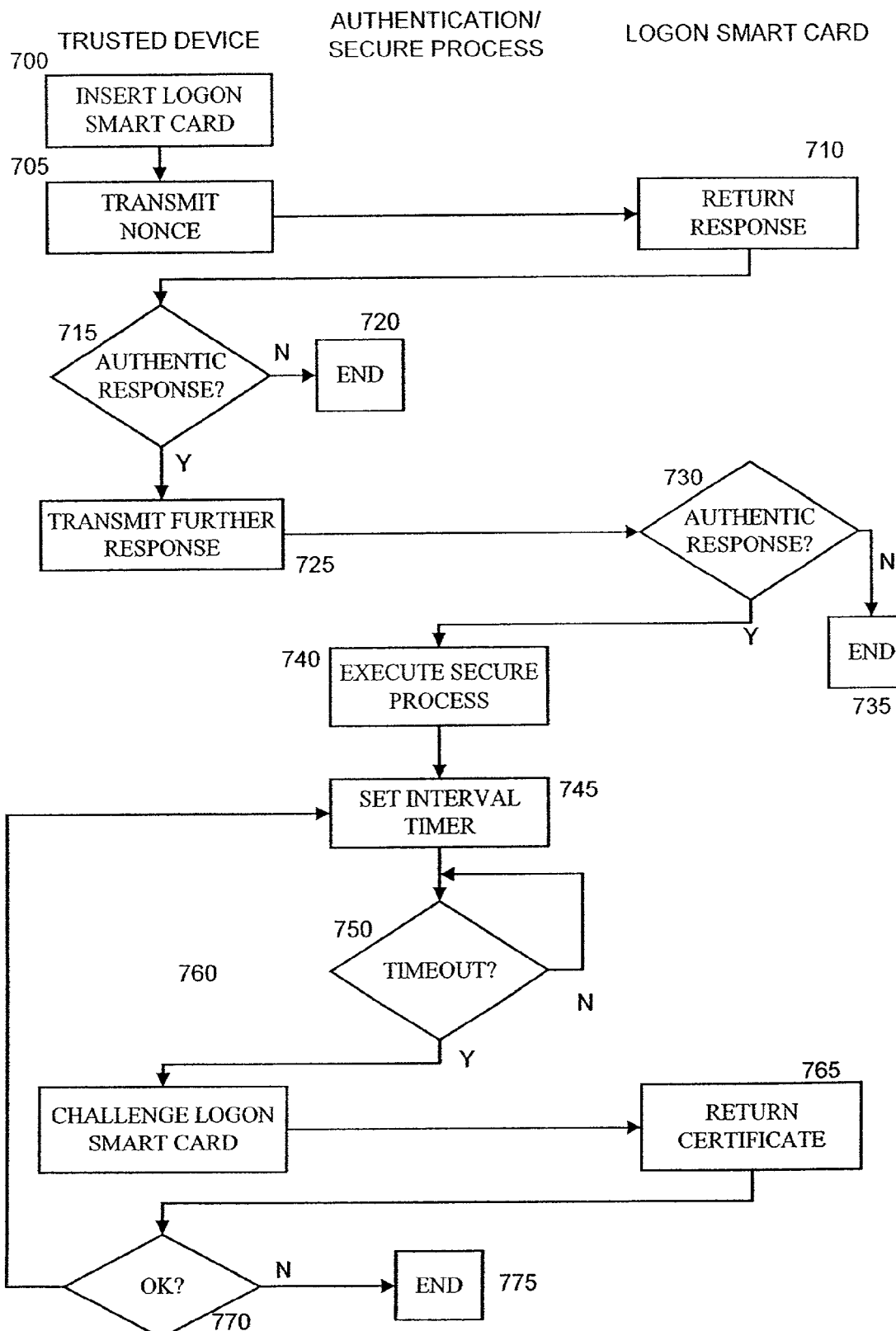
FIG. 6 is a flow diagram which illustrates the steps involved in verification of a trusted computing platform by a potential user of that platform by means of a smart card.

As indicated above, FIG. 6 shows the flow of actions in an example of verification of platform integrity by a user interacting with the trusted platform with a smart card 19. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 1993. Of course, there is no reason why other authentication procedures cannot be used, for example 2-step or 4-step, as also described in this reference.

Initially, the user inserts their smart card 19 into the smart card reader 12 of the platform in step 700.

Beforehand, a platform configured for use by users of in this way will typically be operating under the control of its standard operating system and executing the authentication process, which waits for a user to insert their smart card 19. Apart from the smart card reader 12 being active in this way, such a platform is typically rendered inaccessible to users by 'locking' the user interface (i.e. the screen, keyboard and mouse). This will however not be the case in all embodiments of the invention.

When the smart card 19 is inserted into the smart card reader 12, the trusted device 24 is triggered to attempt mutual authentication in step by generating and transmitting a nonce A to the smart card 19 in step 705. A nonce, such as a random number, is used to protect the originator from deception caused by replay of old but genuine responses (called a 'replay attack') by untrustworthy third parties.

In response, in step 710, the smart card 19 generates and returns a response comprising the concatenation of: the plain text of the nonce A, a new nonce B generated by the smart card 19, an ID of the trusted device 24 and some redundancy; the signature of the plain text, generated by signing the plain text with the private key of the smart card 19; and a certificate containing the ID and the public key of the smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, an ID of the smart card 19 and the acquired integrity metric; the signature of the plain text, generated by signing the plain text using the private key of the trusted device 24; and the certificate comprising the public key of the trusted device 24 and the authentic integrity metric, both signed by the private key of the TP.

The smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the logon card 19 and the smart card 19 has verified the integrity of the trusted platform and, in step 740, the authentication process executes the secure process for the user.

In certain types of interaction, the authentication process can end at this point. However, if a session is to be continued between the user and the trusted platform, it is desirable to ensure that the user remains authenticated to the platform.

Where continued authentication is required, the authentication process sets an interval timer in step 745. Thereafter, using appropriate operating system interrupt routines, the authentication process services the interval timer periodically to detect when the timer meets or exceeds a pre-determined timeout period in step 750.

Clearly, the authentication process and the interval timer run in parallel with the secure process. When the timeout period is met or exceeded, the authentication process triggers the trusted device 24 to re-authenticate the smart card 19, by transmitting a challenge for the smart card 19 to identify itself in step 760. The smart card 19 returns a certificate including its ID and its public key in step 765. In step 770, if there is no response (for example, as a result of the smart card 19 having been removed) or the certificate is no longer valid for some reason (for example, the smart card has been replaced with a different smart card), the session is terminated by the trusted device 24 in step 775. Otherwise, in step 770, the process from step 745 repeats by resetting the interval timer.

Additionally, or alternatively, in some embodiments it may be required that the user profile is encrypted and signed to protect privacy and integrity. If so, a secure data transfer protocol may be needed between the trusted device 24 and the smart card 19. There exist many available mechanisms for transferring secure credentials between two entities. A possible implementation, which may be used in the present embodiment, is secure key transport mechanisms from ISO/IEC DIS 11770-3, "Information technology—Security techniques—Key management—Part 3: Mechanisms using asymmetric techniques", International Organization for Standardization, March 1997.

Modifications of this verification process using other well-known challenge and response techniques can easily be achieved by the skilled person. Similarly, alternative verification processes can be used by parties interacting with the platform in a different manner (that is, other than as a user equipped with a smart card).

A smart card suitable for use as an MCA card in accordance with a preferred embodiment of the invention will now be described. Such a smart card may be essentially an authorised smart card 19 as described above, and may thus interact with the trusted platform 10 and trusted device 24 as described above with reference to FIG. 6.

Figure 7:
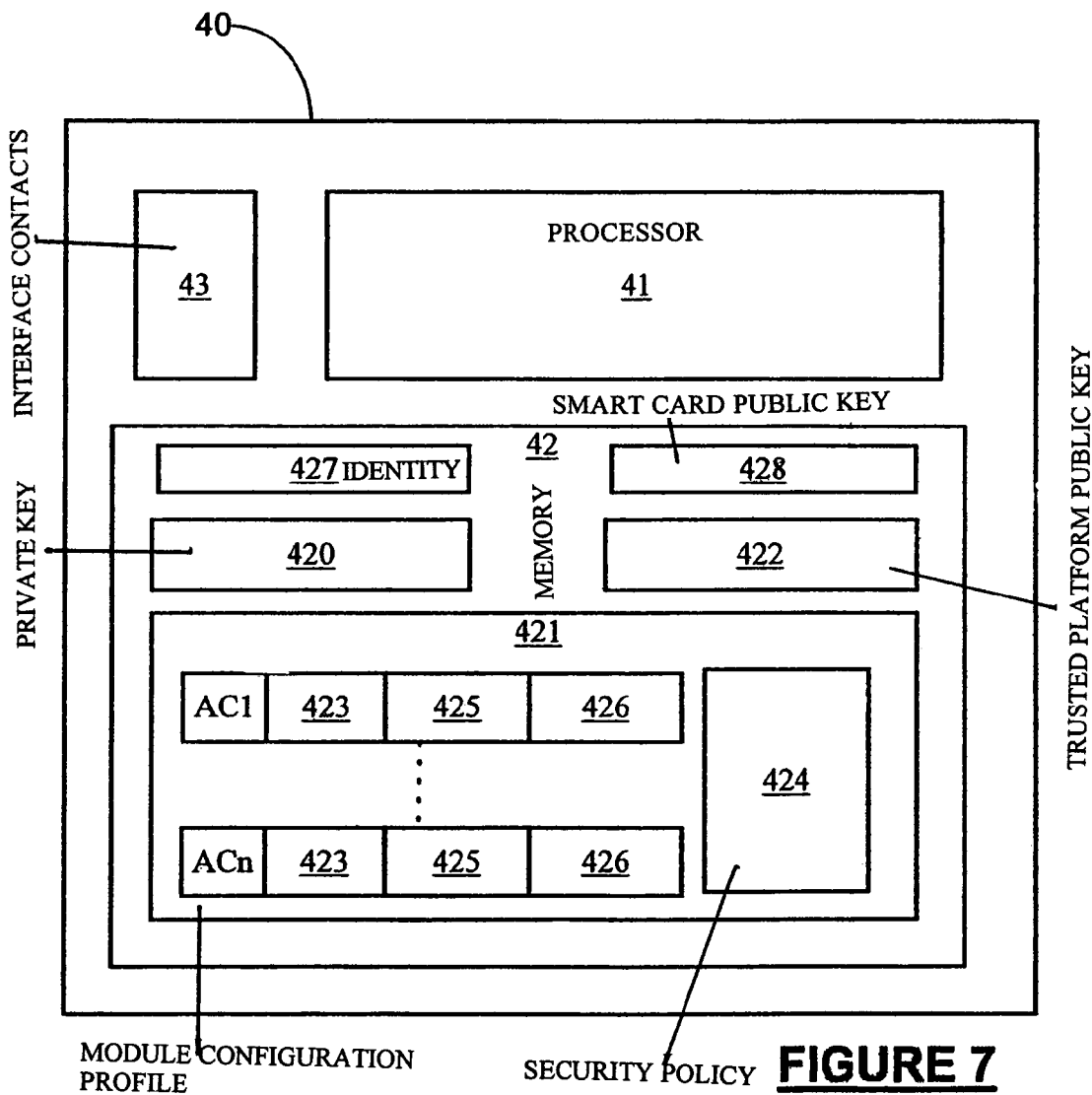
FIG. 7 is a diagram that illustrates the operational parts of a smart card adapted for use in embodiments of the present invention.

A processing part 40 of the smart card 19 is illustrated in FIG. 7. As shown, the smart card processing part 40 has the standard smart card features of a processor 41, a memory 42 and interface contacts 43. The processor 41 is programmed for simple challenge/response operations involving authentication of the smart card 19 and verification of the platform 10, as is described above (with reference to FIG. 6) and will be described below (with reference to FIGS. 8 to 10). The memory 42 contains the smart card private key 420, the smart card public key 428, a module configuration profile 421, the public key 422 of the trusted platform and an identity 427. The module configuration profile 421 lists the registered modules 15 AC1-ACn usable by the computer apparatus (typically, the computer apparatus will be the trusted platform itself—however, the computer apparatus whose configuration is to be verified may be apparatus somehow associated with the trusted platform rather than the trusted platform itself—for example, a peripheral to the trusted platform, or a device on the same local area network as the trusted platform), and the individual security policy 424 for the computer apparatus. For each module 15, the module configuration profile includes respective identification information 423, the trust structure 425 between the modules (if one exists) and, optionally, the type or make 426 of the module.

In the module configuration profile 421, each module 15 entry AC1-ACn includes associated identification information 423, which varies depending upon the type of module (cryptographic identity, serial number identity, or no unique identity)

The 'security policy' 424 dictates the options that a user has on the platform 10 while verifying a module 15. For example, the user interface may be locked or unlocked while a module 15 is authenticated, depending on the function of the module 15. Additionally, or alternatively, certain files or executable programs on the platform 10 may be made accessible or inaccessible, depending on the level of trust for a particular module 15. Moreover, if authentication for a module 15 fails, the user interface may be locked, in which event it cannot be accessed by the user at all, or the user interface may be left unlocked, but in a state such that the functions associated with this unauthorised module are not available for the user.

A 'trust structure' 425 defines whether a module 15 can itself 'introduce' further modules 15 into the system without first requiring authorisation from the MCA smart card 19. In the embodiments described in detail herein, the only defined trust structure is between the MCA smart card 19 and the modules 15 that can be introduced to the platform 10 by the MCA smart card 19. Allowing specified modules 15 to introduce further modules would preferably require such a module 15 to have an equivalent of a module configuration profile listing the or each module that it is able to introduce. To prevent misuse, it is desirable for such a module must be removable, and to be stored apart from the host platform.

As indicated above, authentication between an MCA smart card 19 and the platform can be achieved by the process set out in FIG. 6 above. It will typically not be necessary for the reauthorisation loop to be used, as module configuration authorisation will typically not need to be carried out repeatedly throughout a user session.

When authentication is achieved, the trusted device 24 then interrogates all the modules 15 in the computer apparatus to be validated (typically, but not necessarily, the trusted platform 10 itself). Authentication of different types of module is discussed further below. The trusted device 24 thus obtains an actual module configuration profile—this is compared with the stored module configuration profile on the MCA smart card 19. The result of this comparison is treated in accordance with the security policy 424, with results ranging from uninhibited use of the computer apparatus by the user in the case of a total match, to inhibited or no use of the computer apparatus in the case of a less than total match.

In one possible arrangement, the trusted device 24 and the MCA smart card 19 may be a specific pair, whereby a user is not able to use one smart card to authorise more than one platform and/or a platform cannot be authorised by using more than one smart card. Clearly, this is not the only possibility. Alternatively, one smart card may be adapted to function for more than one platform and/or one platform can be authorised by using more than one smart card.

It may be desirable to ensure that there is a recovery service for MCA smart cards. If such a recovery service exists, if one smart card is lost, the owner of the corresponding platform can ask the recovery service to change the authority relationship from the lost MCA smart card to another MCA smart card. Clearly, the recovery service must exercise great care in making this change, and a high level of trust between the recovery service and each trusted platform concerned is required.

Processes for authenticating the different module types (cryptographic identity, serial number identity, and no self-identity) will now be described.

Figure 8:
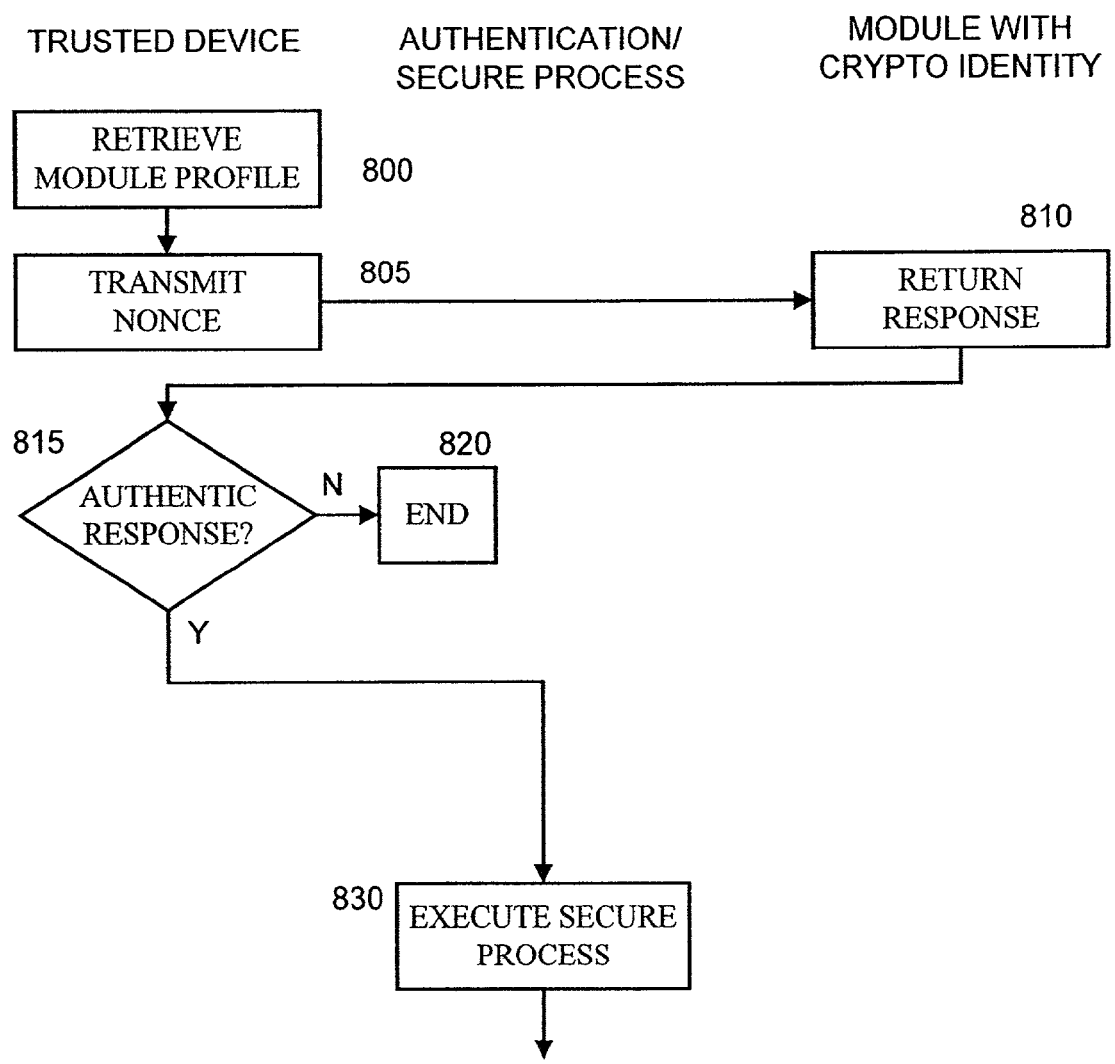
FIG. 8 is a flow diagram that illustrates one example for a host platform to authenticate a module with cryptographic identity.

A preferred process for authenticating a cryptographic identity module 15 by a platform 10 will be described with reference to the flow diagram in FIG. 8. As will be described, the process conveniently implements a challenge/response routine. Again, there exist many available challenge/response mechanisms. The implementation of an authentication protocol used in the present embodiment is unilateral authentication with 2-pass, as described in ISO/IEC 9798-3. Of course, there is no reason why other authentication procedures cannot be used, for example 1-pass, as also described in ISO/IEC 9798-3.

Initially in step 800, the trusted device 24 retrieves a module configuration profile listing the identity information of the module, which may be a certificate of a public key corresponding with the module's private key. It is assumed that the trusted device 24 can verify the validation of the certificate of the module's public key. It then challenges the module by sending a nonce in step 805. After receiving the nonce, in step 810, the module 15 generates and returns a response comprising the concatenation of: the plain text of the nonce, the ID 353 of the trusted device 24 and some redundancy; the signature of the plain text, generated by signing the plain text with the private key of the module 15; and a certificate containing the ID and the public key of the module 15.

The trusted device 24 authenticates the response by using the public key in the certificate to verify the signature of the plain text in step 815. If the response is not authentic, the process ends in step 820. If the response is authentic, in step 830, the authentication process executes some secure processes between the trusted device 24 and the module 15.

Figure 9:
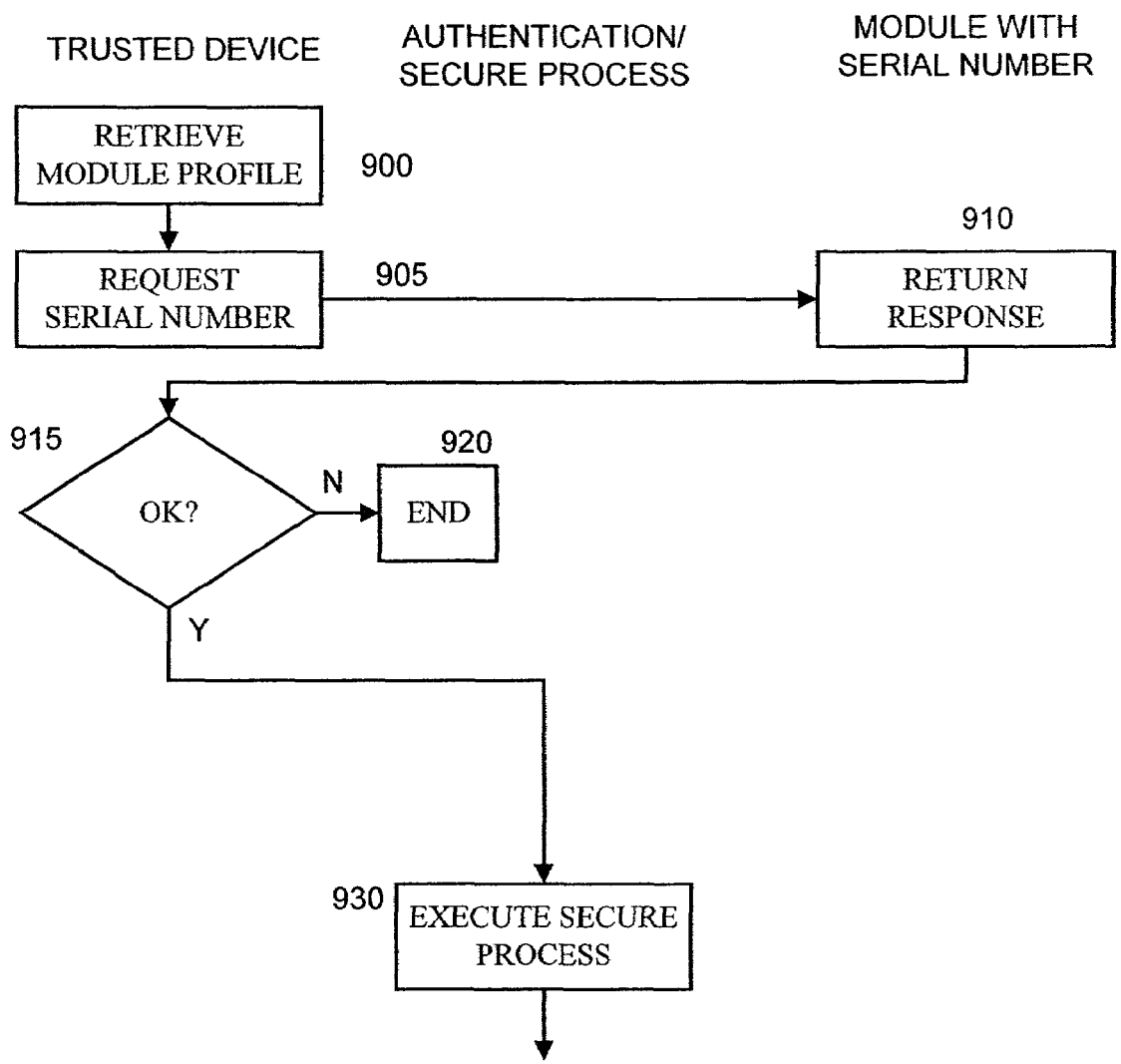
FIG. 9 is a flow diagram that illustrates one example for the host platform to authenticate a module with serial number identity.

A preferred process for authenticating a serial number identity module 15 by a platform 10 will be described with reference to the flow diagram in FIG. 9. The trusted device 24 needs to check if the serial number and other related information of the module match with the data about this module listed in the module configuration profile. If the trusted device 24 is unable to obtain the serial number of a module in a sufficiently secure manner, then it will not be advisable to follow this approach (the approach shown in FIG. 10, in which the MCA smart card 19 plays a positive role, is required).

Initially, the trusted device 24 retrieves a module configuration profile listing the identity information of the module in step 900, then it requests the serial number of the module in step 905. The module 15 returns the response with its serial number in step 910. The trusted device 24 compares this serial number with the data recorded in the module configuration profile in step 915. If it matches, the authentication passes and the following secure process will carry on in step 930; otherwise, the authentication is failed in step 920.

Figure 10:
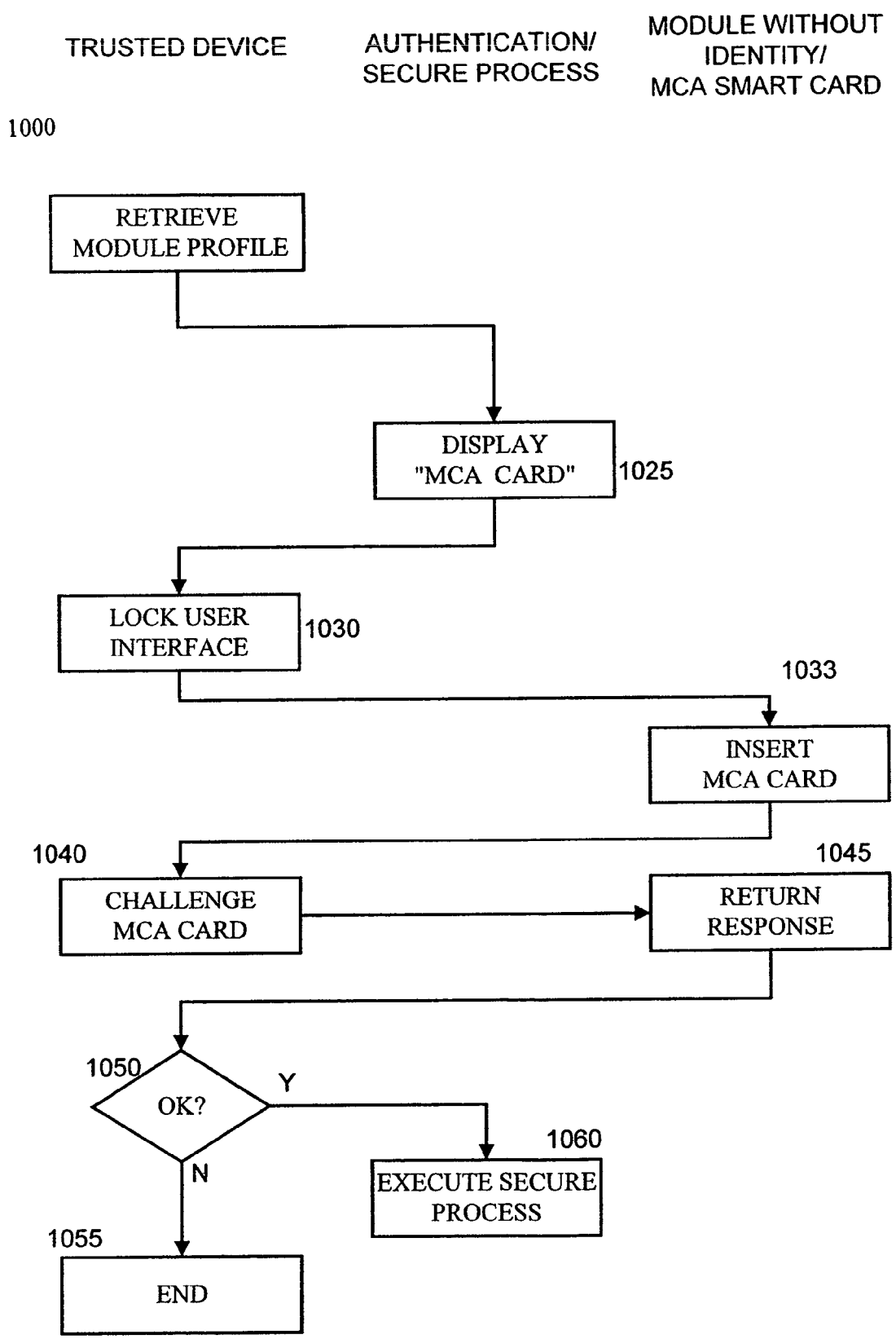
FIG. 10 is a flow diagram that illustrates one example for the host platform to verify the authorisation of a module without distinguishable identity.

A preferred process for verifying authorisation of a module without self-identity 15 by a platform 10 will be described with reference to the flow diagram in FIG. 10. The authorisation of usage of the module can be ensured with on-line help of the MCA smart card.

Initially, the trusted device 24 retrieves a module configuration profile listing the identity information of the module in step 1000. When the trusted device 24 meets a module 15 without a distinguishable identity, the trusted device 24 will ask for presentation of the MCA smart card 19 to confirm a valid authorization of the module. To do so, the trusted device first displays a message to request an MCA smart card 19 in step 1025, and second locks the user interface in step 1030. The user inserts the MCA smart card 19 in step 1033. Authentication between the trusted device 24 and the MCA smart card 19 can choose either unilateral authentication or mutual authentication as shown above. In FIG. 10, we use a unilateral authentication with 2-pass, as described in ISO/IEC 9798-3. The trusted device 24 challenges the MCA smart card 19 in step 1040, and the MCA smart card 19 responds in step 1045. The trusted device 24 authenticates the response in step 1050. If the response is not authentic, the process aborts in step 1055. If the response is authentic, the trusted device accepts the corresponding module, and the following secure process will carry on in step 1060.

If, during the process of authentication of modules, a module is not successfully authenticated, an appropriate measure may be taken in accordance with the security policy 424, such as locking of the user interface. If the authentication procedure fails for any other reason, such as removal of the MCA smart card, the user interface may be temporarily locked—if the user inserts the MCA smart card 19, a new round of authentication is performed between the MCA smart card 19 and the platform 10. Upon successful verification, the user interface will be unlocked.

It is clear that where a trusted computing platform 10 has an associated MCA smart card 19, the MCA smart card 19 should be kept safely and preferably remotely from the platform 10. It is desirable for the MCA smart card 19 to be provided with appropriate security protection, such as a user password, to ensure that it is only used in an authorised manner.

Although in the embodiment described above, the module configuration is stored in a local smart card, other possibilities of providing module configuration in accordance with the invention are available. The module configuration may be provided by a remote smart card, communicating with the trusted platform by an appropriate communication system (most conveniently, by the Internet, though essentially any other communication networks suitable for carrying the relevant amount of data could be suitable). Appropriate secure communication between the remote smart card and the trusted platform 10 can be established by conventional means (essentially as indicated above for communication between a local smart card 19 and the trusted platform 10), although a greater level of encryption may be required. The module configuration may be held with another form of security token (other than a smart card), either locally or remotely.

A further possibility is for the module configuration information to be held on a remote server. Clearly, there will need to be an appropriate trust relationship between the remote server and the trusted platform, together with an appropriate communication path (typically the Internet) and, preferably, secure communication—otherwise the relationship and interactions between the remote server and the trusted platform may be essentially the same as between the MCA smart card and the trusted platform as described above, and the skilled person. There is thus the possibility of having a module configuration authorisation server holding a large number of module configurations, and providing module configuration authorisation as a service.

A further alternative is to have a remote module configuration authorisation (MCA) server as an addition, rather than an alternative, to an MCA smart card. An owner of a computer apparatus could be offered the alternative of using an MCA smart card, an MCA server, or both (requiring the trusted device to communicate with both the MCA smart card and the MCA server for either proper function or reconfiguration). An advantage of requiring MCA server authorisation for function of the computer apparatus is that if both the computer apparatus and the MCA smart card have been stolen, then the owner can notify the operator of the MCA server and the MCA server will no longer authorise operation of the computer apparatus.

Clearly, it is necessary for there to be a mechanism to allow module configurations to be established and modified. Establishment could take place in an initialisation routine after assembly of the trusted platform 10 (in which, for example, the trusted device 24 in communication with MCA smart card 19 interrogates all modules 15 in the trusted platform 10 to establish their identities and records the results to the MCA smart card 19 in a manner comparable to that in which the initial value of the integrity metric is established and stored). Modification may then be allowed by an appropriate user routine when communication with the MCA smart card 19 is subsequently established—for example, when module configuration changes are detected, the user may be requested to authorise such changes (preferably after invocation of an appropriate security mechanism to establish that the user is authorised, such as a password). Where an MCA server and an MCA smart card 19 both exist, a practical arrangement may be to allow routine validation with the MCA smart card 19 alone but only to allow module configuration changes with the cooperation of the MCA server (the opposite arrangement may also be advantageous in some systems—allowing routing validation with an MCA server but configuration changes only with the MCA smart card 19).

Although the embodiments described above use a trusted platform having a trusted device, this arrangement is highly advantageous rather than essential to operation of the invention. An appropriate mechanism is required for checking the modules in the computer apparatus against a securely held module configuration, and also for inhibiting function of the computer apparatus (in according with an appropriate security policy), but these could be achieved by means other than a trusted device as described in the preferred embodiments—for example, by appropriate software in the computer apparatus (although this solution is likely to be less secure than would be the case with use of a trusted device). However, for computer apparatus other than a general purpose computing platform, use of software or another solution (such as a dedicated ASIC) may be a satisfactory solution.

The invention claimed is:

1. A method of protecting from modification computer apparatus comprising a plurality of functional modules, wherein the computer apparatus contains or is in communication with a trusted device adapted to respond to a user in a trusted manner, the method comprising:

storing a module configuration of the computer apparatus providing an identification of each functional module in the computer apparatus, wherein the module configuration is stored on a smart card;

the trusted device performing a cryptographic identification process for modules with a cryptographic identity to identify said modules and thereby determine an actual module configuration;

the trusted device comparing the actual module configuration against the stored module configuration, wherein the trusted device is adapted to communicate securely with the stored module configuration; and the trusted device inhibiting function of the computer apparatus while the actual module configuration does not satisfactorily match the stored module configuration.

2. A method as claimed in claim 1, wherein the stored module configuration is held separately from the computing apparatus.

3. A method as claimed in claim 1, wherein the stored module configuration is stored such that it is accessible only by a cryptographic authentication process.

4. A method as claimed in claim 1, wherein the step of checking of the actual module configuration comprises a cryptographic identification process for modules with a cryptographic identity.

5. A method as claimed in claim 1, wherein a stored module configuration is held by a remote module validation authority and the remote validation authority provides a service allowing a replacement smart card to be provided if a smart card is lost or stolen.

6. A method as claimed in claim 1, wherein the trusted device is a tamper-resistant or a tamper-detecting device.

7. Computer apparatus adapted for protection against modification, the computer apparatus comprising a plurality of functional modules, one of said modules being a trusted device adapted to respond to a user in a trusted manner, the computer apparatus having a module configuration providing an identification of each functional module in the computer apparatus, wherein the trusted device is adapted to compare a module configuration of the computer apparatus against a stored module configuration by performing a cryptographic identification process for modules with a cryptographic identity to determine an actual module configuration and to compare the actual module configuration against the stored module configuration, wherein function of the computer apparatus is inhibited while the actual module configuration does not satisfactorily match the stored module configuration, wherein the stored module configuration is stored on a smart card.

8. Computer apparatus as claimed in claim 7, wherein the stored module configuration is held separately from the computing apparatus and wherein the computer apparatus is adapted to obtain the stored module configuration by a cryptographic authentication process.

9. Computer apparatus as claimed in claim 7, wherein the trusted device is a tamper-resistant or a tamper-detecting device.

10. A method of protecting from modification computer apparatus comprising a plurality of functional modules by monitoring the configuration of functional modules within the computer apparatus, the method comprising:

storing a module configuration of the computer apparatus on a smart card, the module configuration being an identification of each functional module in the computer apparatus as validly formed, on a security token removably attachable to the computer apparatus; and checking an actual module configuration against the stored module configuration, wherein the computer apparatus contains or is in communication with a trusted device adapted to respond to a user in a trusted manner and the trusted device inhibits function of the computer apparatus if the actual module configuration does not satisfactorily match the stored module configuration;

wherein the trusted device is adapted to communicate securely with the smart card.

11. A method as claimed in claim 10, wherein the stored module configuration is stored such that it is accessible only by a cryptographic authentication process.

12. A method as claimed in claim 11, wherein the trusted device is adapted to perform the step of checking the actual module configuration against the stored module configuration.

13. A method as claimed in claim 10, wherein the stored module configuration is also held by a remote module validation authority.

14. A method as claimed in claim 13, wherein the step of checking the actual module configuration against the stored module configuration involves use of the stored module configuration held by the remote module validation authority.

15. A method as claimed in claim 13, wherein the remote validation authority provides a service allowing a replacement smart card to be provided if a smart card is lost or stolen.

16. A method as claimed in claim 10, wherein the trusted device is a tamper-resistant or a tamper-detecting device.

* * * * *